(12) United States Patent
Rand et al.

(10) Patent No.: US 8,883,886 B2
(45) Date of Patent: Nov. 11, 2014

(54) DURABLE THERMOSET BINDER COMPOSITIONS FROM 5-CARBON REDUCING SUGARS AND USE AS WOOD BINDERS

(75) Inventors: Charles J. Rand, Philadelphia, PA (US); Barry Weinstein, Dresher, PA (US); Drew E. Williams, Blue Bell, PA (US)

(73) Assignee: Rohm and Haas Company, Philadelphia, PA (US)

( * ) Notice: Subject to any disclaimer, the term of this patent is extended or adjusted under 35 U.S.C. 154(b) by 239 days.

(21) Appl. No.: 13/091,268

(22) Filed: Apr. 21, 2011

(65) Prior Publication Data

US 2011/0263757 A1    Oct. 27, 2011

Related U.S. Application Data

(60) Provisional application No. 61/326,777, filed on Apr. 22, 2010, provisional application No. 61/333,025, filed on May 10, 2010, provisional application No. 61/382,978, filed on Sep. 15, 2010.

(51) Int. Cl.
*C08K 5/07* (2006.01)
*C08L 79/02* (2006.01)
*C08L 97/02* (2006.01)
*C09J 179/02* (2006.01)

(52) U.S. Cl.
CPC .............. *C08L 79/02* (2013.01); *C08L 97/02* (2013.01); *C09J 179/02* (2013.01)
USPC ................. 524/58; 524/13; 524/55; 264/128

(58) Field of Classification Search
USPC .................................. 524/13, 55, 58; 264/128
See application file for complete search history.

(56) References Cited

U.S. PATENT DOCUMENTS

| | | | |
|---|---|---|---|
| 2,215,825 A | 9/1940 | Wallace et al. | |
| 3,274,012 A | 9/1966 | Cooper et al. | |
| 3,513,001 A | 5/1970 | Worthington et al. | |
| 4,107,379 A | 8/1978 | Stofko | |
| 4,183,997 A | 1/1980 | Stofko | |
| 4,524,164 A | 6/1985 | Viswanathan et al. | |
| 5,371,194 A | 12/1994 | Ferretti | |
| 5,661,213 A | 8/1997 | Arkens et al. | |
| 5,895,804 A | 4/1999 | Lee et al. | |
| 5,905,115 A | 5/1999 | Luitjes et al. | |
| 6,262,159 B1 | 7/2001 | Dreher et al. | |
| 6,299,936 B1 | 10/2001 | Reck et al. | |
| 6,753,361 B2 | 6/2004 | Kroner et al. | |
| 7,026,390 B2 * | 4/2006 | O'Brien-Bernini et al. | .. 524/502 |
| 7,195,792 B2 | 3/2007 | Boston et al. | |
| 7,199,179 B2 | 4/2007 | Clamen et al. | |
| 7,470,520 B1 * | 12/2008 | Elashvili | ........................ 435/38 |
| 7,494,566 B2 * | 2/2009 | Carroll et al. | ............. 162/164.1 |
| 7,579,289 B2 | 8/2009 | Clamen et al. | |
| 7,655,711 B2 | 2/2010 | Swift et al. | |
| 7,766,975 B2 | 8/2010 | Clamen et al. | |
| 7,893,154 B2 | 2/2011 | Van Herwijnen et al. | |
| 2005/0130261 A1* | 6/2005 | Wils et al. | .................... 435/68.1 |
| 2006/0204589 A1* | 9/2006 | Nelson et al. | ................. 424/531 |
| 2006/0239889 A1 | 10/2006 | Lewis et al. | |
| 2007/0123679 A1 | 5/2007 | Swift et al. | |
| 2007/0123680 A1 | 5/2007 | Swift et al. | |
| 2008/0051539 A1 | 2/2008 | Kelly | |
| 2008/0191179 A1 | 8/2008 | Bernard et al. | |
| 2009/0170978 A1 | 7/2009 | Kelly | |
| 2009/0324915 A1 | 12/2009 | Swift et al. | |
| 2010/0087571 A1 | 4/2010 | Jackson et al. | |
| 2010/0282996 A1 | 11/2010 | Jaffrennou et al. | |
| 2011/0039111 A1 | 2/2011 | Shooshtari | |
| 2011/0040010 A1 | 2/2011 | Shooshtari | |
| 2011/0210280 A1 | 9/2011 | Jaffrennou | |

FOREIGN PATENT DOCUMENTS

| | | |
|---|---|---|
| DE | 1905054 | 8/1969 |
| EP | 0020004 A1 | 12/1980 |
| EP | 0044614 A2 | 1/1982 |
| GB | 2078805 A | 1/1982 |
| JP | 49071121 A | 7/1974 |
| JP | 2005239706 A | 9/2005 |
| WO | 2007014236 A2 | 2/2007 |
| WO | 2008091256 A1 | 7/2008 |
| WO | 2009004261 A2 | 1/2009 |
| WO | 2009006532 A1 | 1/2009 |
| WO | 2009019232 A1 | 2/2009 |
| WO | 2009019235 A1 | 2/2009 |
| WO | 2009149334 A2 | 12/2009 |
| WO | 2011019597 A1 | 2/2011 |
| WO | 2011019598 A1 | 2/2011 |
| WO | 2011044490 A1 | 4/2011 |

OTHER PUBLICATIONS

Potman, R. P., et al., "Mechanistic studies of the Maillard reaction with emphasis on phosphate-mediated catalysis," In thermal generation of aromas; Chapter 17; Parliment, T., et al., ACS SYmposium Series, American Chemical Society: Washington, DC, 1989, 182-195.*
Lee, S. M., Amine Equivalent Weight, Definition. Dictionary of Composite Materials Technology, 1989, p. 9.*
Micheel et al., "D-Glucose Derivatives of Proteins," Chemical Abstracts, vol. 51, No. 4, Feb. 1, 1957, pp. 1-2.
"Melanoidin,"at http://en.wikipedia.org/wiki/Melanoidin.

* cited by examiner

*Primary Examiner* — Mark Eashoo
*Assistant Examiner* — Nicolas Hill
(74) *Attorney, Agent, or Firm* — Andrew E. C. Merriam

(57) ABSTRACT

The present invention provides thermosetting aqueous binder compositions of (i) one or more diprimary diamine, e.g. lysine, or poly(primary amine), e.g. polyethylenimine and tris(2-aminoethyl)amine, and (ii) one or more 5-carbon reducing sugar, such as xylose. The binders are at least substantially formaldehyde free and cure rapidly at temperatures sufficiently low and with sufficiently little swelling to enable one to provide wood or woody material containing articles, such as particle board, oriented strand board and bamboo boards or articles.

10 Claims, No Drawings

DURABLE THERMOSET BINDER COMPOSITIONS FROM 5-CARBON REDUCING SUGARS AND USE AS WOOD BINDERS

This application claims the benefit of priority under 35 U.S.C. §119(e) of U.S. Provisional Patent Application Nos. 61/326,777 filed on Apr. 22, 2010; 61/333,025 filed on May 10, 2010 and 61/382,978 filed on Sep. 15, 2010.

The present invention relates to aqueous binder compositions comprising one or more 5-carbon reducing sugar, and uses thereof as curable binders for a variety of finely divided substrate materials, particularly wood and lignocellulosic materials, as well as the products formed therefrom.

Due to their favorable cost/performance, the thermosetting binder resins of choice in the past have been phenol/formaldehyde or urea/formaldehyde resins. Applications for formaldehyde resins are extensive, including mineral and glass fiber binding and binding of finely divided wood materials under pressure to make wood composites, such as fiberboard and engineered wood. Existing commercial formaldehyde-free binders most commonly contain a polycarboxylic acid polymer and a polyol that esterify and form a thermoset when heat cured. However, these binders are known to be derived primarily from petroleum feed stocks which are dwindling and experiencing wide price fluctuations and that contribute to atmospheric carbon dioxide. Further, formaldehyde is recognized as highly toxic and has been classified as a human carcinogen by several health authorities; and environmental, health and safety (EHS) initiatives as well as new regulations are demanding formaldehyde free binders for composites in all kinds of building materials, especially those intended for interior use which might release formaldehyde gas indoors.

Other resins useful in making composites from finely divided wood include methylene di-isocyanates (MDIs). These resins cure quickly but are far more expensive than formaldehyde containing resins; in addition, they are very tacky and can disrupt processing by fouling the press or platen in use.

Recent formaldehyde free binders made from sustainable materials that are not derived from petroleum feed have been proposed for making wood composites. U.S. Patent Publication no. 2010/0087571 A1 to Jackson et al discloses formaldehyde free binder compositions that form melanoidins from the condensation of proteins or amino acids with reducing sugars as thermosets. However, these compositions when used as binders cure only in conditions that are far too harsh for use as binders for wood materials. Further, these compositions provide cured products with inadequate bond strength and water resistance.

The present inventors have sought to provide a formaldehyde free binder to solve the problem of providing renewable source thermosetting binders that meet the need for a more durable, water resistant formaldehyde-free binder that develops strength at a low enough temperature to make wood containing composite and board products, i.e. wood or woody material containing articles.

STATEMENT OF THE INVENTION

According to the present invention, aqueous binder compositions comprise (i) one or more diprimary diamine, such as lysine, poly(primary amines), such as polyamines having a weight average molecular weight of 5,000 or less, preferably 3,800 or less, or, more preferably, 2,500 or less, e.g. polyethyleneimines, and (ii) one or more 5-carbon reducing sugar chosen from 5-carbon reducing mono- and di-saccharides; natural or synthetic stereoisomers thereof; or optical isomers thereof hydroxy, halo, alkyl, alkoxy or carbonyl substituted 5-carbon reducing mono- and di-saccharides, and dehydrated forms of 5-carbon reducing mono and di-saccharides. Preferably, the aqueous binder compositions are substantially free of strong acids and are substantially free of polycarboxylic acids.

Suitable diprimary diamines or poly(primary amine)s have an amine equivalent weight of 400 or less, preferably 200 or less.

In yet another aspect of the invention, the poly(primary amine)s comprise polymers having 10 wt. % or more, or, preferably, 20 wt. % or more, of primary amine groups, such as ethylamines.

The 5-carbon reducing sugars in one embodiment have a formula weight of 500 or less atomic mass units. Preferred 5-carbon reducing sugars include, for example, xylose, arabinose and ribose. Other 5-carbon reducing sugars include, for example, deoxyribose.

The 5-carbon reducing sugars may be part of an admixture containing polysaccharides having a higher formula weight, such as plant feedstocks containing 5-carbon reducing sugars or other arabinoxylan feed stocks which can generate 5-carbon sugars. These may include, for example, fermented hemicellulose, e.g. from wood or bamboo, enzymatically digested wheat bran, enyzmatically digested corn cob, enzymatically digested corn fiber, and acid hydrolysis products of any of these plant feedstocks.

The number of equivalents of primary amine relative to the number of equivalents of carbonyl (as aldehyde or ketone) groups in the reducing sugar may range from 0.2:1 or higher and up to 4:1, or, up to 2:1, or, 0.4:1 or higher, or, up to 0.6:1, or, preferably, 0.8:1 or higher, or, more preferably, 1.6:1 or lower. A 2:1 equivalent ratio of primary amine to carbonyl in the reducing sugar equates to equal molar di-primary diamine per one mole of a reducing sugar having one carbonyl group, e.g. xylose. In some applications, the equivalent ratio of primary amine groups to carbonyl groups may range as low as 0.05:1 to 0.2:1.

The aqueous binder compositions may further comprise one or more capping agent, such as a titanate, zirconate or aluminate, for example titanium lactate. Such capping agents may be used in the amount of from 0.5 to 5 wt. %, based on the total binder solids.

The aqueous binder compositions may further comprise one or more reducing agent to limit exotherm during cure, such as, for example, a (meta)bisulfite or a vicinal diol, such as glycerin, ethylene glycol and propylene glycol.

The aqueous binder compositions may further comprise one or more extender such as, for example, a soy protein or defatted soy flour.

The aqueous binder compositions may further comprise a vinyl emulsion or dispersion polymer having up to 10 wt. %, based on the total weight of copolymerized monomers, of copolymerized carboxyl group containing monomers. Such a polymer may be a (meth)acrylate copolymer comprising greater than 30 wt. %, based on the total weight of copolymerized monomers, of a copolymerized $C_2$ or higher alkyl (meth)acrylate, or a (meth)acrylate copolymer having up to 5 wt. %, or, preferably, up to 3 wt. %, based on the total weight of copolymerized monomers of copolymerized carboxyl group containing monomers, such as methacrylic acid.

The aqueous binder compositions may further comprise 0.2 wt. % or more, or, preferably up to 5 wt. %, based on the total binder solids, of an organosilane.

The aqueous binder compositions may further comprise one or more water proofing agent chosen from a $C_5$ to $C_{30}$ alk(en)yl 2-hydroxyethyl alk(en)amide, $C_5$ to $C_{30}$ alk(en)yl bis(2-hydroxyethyl)amide, $C_{11}$ to $C_{30}$ alk(en)yl 2-hydroxyethyl(alk(en))amine, $C_{11}$ to $C_{30}$ alk(en)yl bis(2-hydroxyethyl)amine, $C_{11}$ to $C_{30}$ alk(en)yl tris(2-hydroxyethyl)amine, $C_5$ to $C_{30}$ alk(en)yl monoglyceride, $C_5$ to $C_{30}$ alk(en)yl monocarboxylate of a trihydric polyol, (poly)alkoxylated amines and (poly)alkoxylated alk(en)yl monocarboxylates. Such waterproofing agents may be used in amounts of up to 10 wt. %, based on the total binder solids.

The aqueous binder compositions may further comprise a phosphorous-containing accelerator or esterification catalyst, such as an alkali metal hypophosphite, and alkali metal hydrogen phosphonate, mono and di alkali metal phosphonates, alkylphosphonic and arylphosphonic or phosphinic acids including their alkali metal salts. Suitable catalysts may be used in amounts of 0.1 wt. % or more, or up to 30 wt. %, based on the total binder solids, preferably, 4.0 wt. % or more or up to 20 wt. %.

In addition, the present invention provides methods of treating substrates, such as fibers and finely divided materials, with the aqueous binder compositions, followed by drying and heat curing.

In making wood or woody material containing articles, the present invention provide methods comprising admixing the aqueous binder compositions with finely divided wood or woody materials, followed by pressing and heating to form the product. The methods may include drying the finely divided wood or woody materials at temperatures of from 20 to 185° C. prior to admixing them with the aqueous binder compositions, preferably from 75 to 125° C. Plywood may be made in alternative processes wherein the aqueous binder composition is applied to a wood layer or sheet and a wood layer or sheet is applied thereto, followed by pressing and heating, and, optionally, repeating to achieve the desired plywood thickness.

Further, the present invention provides wood or woody material containing articles made according to the methods of the present invention. Such articles include, for example, chip-, particle- or fibre-board, oriented strand board, plywood, bamboo plywood and composites, and other engineered wood, such as, for example, medium density fiberboard (MDF).

As used herein, the phrase "alkyl" means any aliphatic alkyl group having one or more carbon atoms, the alkyl group including n-alkyl, s-alkyl, i-alkyl, t-alkyl groups or cyclic aliphatics containing one or more 5, 6 or seven member ring structures.

As used herein, the phrase "aqueous" includes water and mixtures composed substantially of water and water-miscible solvents.

As used herein, the phrase "emulsion polymer" refers to a polymer that when combined with water or aqueous solvent forms a disperse phase of polymer in water.

As used herein, the phrase "substantially formaldehyde-free" refers to compositions free from added formaldehyde, and which do not liberate substantial formaldehyde as a result of drying and/or curing. Preferably, such binder or material that incorporates the binder liberates less than 100 ppm of formaldehyde, more preferably less than 25 and most preferably less than 5 ppm of formaldehyde, as a result of drying and/or curing the binder.

As used herein, the term "poly(primary amine)" means any compound having three or more primary amine groups, such as tris(2-aminoethyl)amine and polyethyleneimine.

As used herein, the term "polymer" includes the term "copolymer", and, unless otherwise indicated, the term "copolymer" refers to polymers made from any two or more different monomers, including, for example, terpolymers, pentapolymers, homopolymers functionalized after polymerization so that two or more different functional groups are present in the product copolymer, block copolymers, segmented copolymers, graft copolymers, and any mixture or combination thereof. (Co)polymer means homopolymer or copolymer.

As used herein the term "substantially free of strong acids" means that a composition contains less than 0.1 weight % mineral acid based on the total binder solids.

As used herein, the term "substantially free of polycarboxylic acids" means that a composition contains less than 1.0 wt. % based on the total binder solids of polycarboxylic acids, including polyprotic polycarboxylic acids, e.g. citric acid, and polymeric polycarboxylic acids, e.g. acrylic or vinyl solution polymers having more than 10 wt. % of copolymerized carboxyl group containing monomers. As used herein, the term "polycarboxylic acids" excludes emulsion polymers having 10 wt. % or less of copolymerized carboxyl group containing monomers.

As used herein, the term "wood, or woody materials" include finely divided materials in any form, including shredded, sawdust, chips, shavings, flakes, or ground material from any wood feedstock, any part of wood, and any woody plant material, including softwood, hardwood, pulp, bark, bamboo, seed husks, nut shells and other hard plant or lignocellulosic materials.

As used herein, unless otherwise indicated, the term "weight average molecular weight" refers to the molecular weight of a substance as determined by size exclusion gel chromatography (SEC).

As used herein, "wt. %" or "wt. percent" means weight percent based on solids.

As used herein, the phrase "based on the total binder solids" refers to weight amounts of any given ingredient in comparison to the total weight amount of all of the non-volatile ingredients in the binder (e.g., saccharide(s), primary amines, capping agents, silanes, emulsion copolymer(s), reactive water proofing agents, and the like).

The singular forms "a," "an," and "the" include plural referents unless the context clearly dictates otherwise. Unless defined otherwise, technical and scientific terms used herein have the same meaning as is commonly understood by one skilled in the art.

Unless otherwise indicated, any term containing parentheses refers, alternatively, to the whole term as if no parentheses were present and the term without that contained in the parentheses, and combinations of each alternative. Thus, the term "(meth)acrylate" encompasses, in the alternative, methacrylate, or acrylate, or mixtures thereof.

The endpoints of all ranges directed to the same component or property are inclusive of the endpoint and independently combinable. Thus, for example, a disclosed range of a ratio of from 0.2:1 or higher and up to 4:1, preferably 0.6:1 or higher, or, preferably, 1.0:1 or higher, or up to 2.0:1 means any and all of from 0.2:1 to 1.0:1, from 0.2:1 to 2.0:1, from 0.2:1 to 0.6:1, from 0.2:1 to 4:1, from 0.6:1 to 2.0:1, from 0.6:1 to 1.0:1, from 0.6:1 to 4:1, from 1.0:1 to 2.0:1, and from 2.0:1 to 4:1.

For each aqueous binder composition described herein, there exists an accompanying embodiment in which the aqueous composition is a binder composition and in which the cured composition is present in a material or product with a finely divided material. As defined herein, the term "finely divided material" refers to materials chosen from fibers, slivers, chips, particles, and combinations thereof.

Unless otherwise indicated, conditions of temperature and pressure are room temperature and standard pressure, also referred to as "ambient conditions". The aqueous binder compositions may be dried under conditions other than ambient conditions.

The aqueous binder composition of the present invention comprises largely renewable materials from natural sources, such as wheat bran and corn fiber and hemicellulose streams as wood or woody materials. The hot wet tensile strength and, thus durability of binder treated products is improved through the use of the aqueous binder compositions of the present invention. In addition, as shown by the rapid development of physical properties during cure, the aqueous binder compositions exhibit a lower cure energy when compared to dextrose binders from other natural or renewable feedstocks, such as corn syrups.

The 5-carbon sugar and primary diamines or primary polyamines provide non-toxic aqueous binder compositions to replace toxic compositions, such as furfural containing binders.

The present invention provides aqueous binder compositions comprising a total solids of from 5 to 100 wt. %, or up to 95 wt. %, or, preferably, 40 wt. % or more, or, preferably, 50 wt. % or more), or, more preferably, up to 70 wt. %, based on the total weight of the aqueous binder. The aqueous binders also include powdered binders which can be derived from drying any of the aqueous binder solutions.

The aqueous binder composition of the present invention comprises at least one 5-carbon reducing sugar, which is a mono-saccharide or di-saccharide. A reducing sugar herein is any sugar that has an aldehyde or a ketone in its open chain form. This allows the sugar to act as a reducing agent. A sugar may be a reducing sugar when its anomeric carbon (the carbon linked to two oxygen atoms) is in the free form. Sugars may occur in a chain as well as a ring structure and it is possible to have an equilibrium between these two forms. Further, some keto sugars are reducing sugars because they may be converted to an aldehyde via a series of tautomeric shifts to migrate the carbonyl to the end of the chain. This pathway could become accessible during the thermal curing process. Reducing sugars include all monosaccharides. Accordingly, the 5-carbon reducing sugar may be a monosaccharide in its aldose or ketose form. Most disaccharides are also reducing sugars, and may include, for example, dimers of 5-carbon mono-saccharides.

Suitable 5-carbon sugars are aldoses and isomerizable ketoses having a formula of $C_n(H_2O)_n$ where n is 5 and mixtures containing these 5 carbon sugars. Other natural or synthetic stereoisomers or optical isomers of such 5-carbon reducing sugars may also be useful as the reducing sugar of the aqueous binder composition; for example, D-xylose which is the naturally occurring optical isomer of xylose. The 5-carbon reducing sugar optionally may be substituted, for example with hydroxy, halo, alkyl, alkoxy, or other substituent groups. In addition, the reducing sugar can comprise a dehydrated form of a reducing mono- or di-saccharide, such as, a furfural intermediate generated from the dehydrogenation xylose.

Examples of suitable 5-carbon reducing sugars include aldopentose sugars include ribose, arabinose, xylose, and lyxose; and ketopentose sugars include ribulose, arabulose, xylulose, and lyxulose. Plant materials containing any of these are suitable for use in the present invention, including acid hydrolysis or enzyme treated hemicellulose, such as wheat bran digested with a β-1,4-endoxylanase and a β-xylosidase to yield a composition containing xylose. One suitable enzyme for use in digesting plant materials, such as corn (cob and/or husk) and wheat bran is Accelerase™ enzyme available from Genencor (Danisco A/S, Copenhagen, DN).

The aqueous binder compositions can further include one or more other reducing sugar, including, for example, a triose, a tetrose, a hexose, or a heptose. Reducing sugars include glucose, fructose, glyceraldehydes, lactose, and maltose. Glyceraldehyde and dihydroxyacetone are considered to be aldose and ketose sugars, respectively. Examples of aldotetrose sugars include erythrose and threose; and ketotetrose sugars include erythrulose. Examples of aldohexose sugars include glucose (for example, dextrose), mannose, galactose, allose, altrose, talose, gulose, and idose; and ketohexose sugars include fructose, psicose, sorbose, and tagatose. Ketoheptose sugars include sedoheptulose.

The one or more 6-carbon reducing sugar may be present in the aqueous binder composition in amounts of up to 75 wt. %, preferably, up to 60 wt. %, or, more preferably, up to 50 wt. %, based on the total weight of reducing sugars.

Suitable primary di-amines and polyprimary polyamines may include, for example, alkyl diprimary or higher primary diamines, such as aliphatic primary diamines, such as aminoguanidine and its salts, e.g. aminoguanidine hydrochloride, putrescine, n-alkylenediamines, like ethylene diamine, hexamethylene diamines, and other alkylene di-amines; cycloaliphatic primary diamines, such as, for example, di-aminoethylpiperazine; primary amine functional amino acids, such as lysine and aminoglycine; and aromatic di-primary amines, such as, for example, bis-(aminomethyl) cyclohexane (bisAMC), diamino diphenyl methane, xylene-diamines, such as m-xylenediamine (MXD); diamine oligomers, such as diethylenetriamines; triamines, such as, tris(2-aminoethyl)amine (TRIS), plant and naturally derived proteins containing primary amine functional polypeptides, such as bio-mass gelatins, and plant and animal based proteins having 3 wt. % or more of peptide residues, e.g. lysine, having primary amine groups, such as, fish gelatins sold by Norland Products Inc. (Cranbury, N.J.), and albumins; and polyamine polymers of the desired molecular weight, such as polyethyleneimines, polyethylenimine containing copolymers and block copolymers having 10 wt. % or more of primary amine groups, (co)polymers of n-aminoalkyl(meth) acrylates, such as aminoethyl methacrylate, polyguanidines, and any other (co)polymer which has at least 10 wt. %, preferably 20 wt. %, of primary amine groups. On such polyamine may be, for example, a branched polyethyleneimine having 10 wt. % of ethylenediamine groups. One suitable cycloaliphatic primary diamine is PRIMENE™ MD from Dow Advanced Materials, formerly the Rohm and Haas Company (Philadelphia, Pa.).

In general, the number of equivalents of primary amine relative to the number of equivalents of carbonyl (as aldehyde or ketone) groups in the reducing sugar should range from a ratio of 0.2:1 or higher and up to 4:1. In the case of diamines, this ratio is preferably 0.8 to 1.6:1. In the case of polyprimary amines having three or more primary amine groups such as, polyethyleneimine or tris(2-aminoethylamine), the preferred ratio of primary amine to carbonyl equivalents is much lower such as 0.2:1 to 0.6:1.

In the case of polyamines derived from natural sources such as gelatins, albumins and soy proteins, the preferred ratio of the number of equivalents of primary amine groups to carbonyl groups may be low, such as, for example, 0.05:1 to 0.15:1.

Capping agents useful in the present invention may be chosen from, for example, a titanate, zirconate, aluminate, zincate, organo-tin salt, mono- and di-carboxylate salt of aluminum, mono- and di-carboxylate salt of magnesium, and capping agents having the formula $MX_n$, wherein M is a metal, X is an organic acid, reducing sugar or alkoxy(alkyl)

group, and n is an integer of from 1 to 5. Suitable titanates and zirconates may include, for example, organic titanates and zirconates sold by DuPont under the Trade name Tyzor, for example, water soluble Tyzors, such as, Tyzor™ LA, Tyzor™ 131, Tyzor™ TEA, Tyzor™ TE, Tyzor™ 217, and Tyzor™ 218; dibutyltin dilaurate, other organo-tin salts, such as tin (IV) alkoxylates; mono- and di-carboxylate salts of aluminum or magnesium, and capping agents having the formula $MX_n$ wherein M is a metal, X is an organic acid, keto-acid, e.g., gluconic acid, reducing sugar or alkoxy(alkyl) group, and n is an integer of from 1 to 5, such as iron (II) (gluconate)$_2$. The capping agent may be chosen from, for example, the citrates, lactates, and gluconates of zinc, aluminum, zirconium, iron, magnesium, tin, titanium and boron; and their mixed metal salts; organo-tin compounds or salts; and titanates or zirconates of alcohols or carboxylic acids. A combination of capping agents may also be used. Preferably, the capping agent is water soluble, which means it has a solubility in water of greater than 1 gram per liter.

The aqueous binder compositions may have no added alkali, such that the pH of the aqueous binder is neutral to alkaline, e.g. 7.0 or higher or 7.4 or higher. Such compositions can be substantially free of strong acids (pKa of 3.0 or less), or polycarboxylic acids or their amine or ammonia salts.

For flexible binders and for making more flexible wood containing products, the aqueous binder composition may further comprise an emulsion polymer. Suitable emulsion polymers may comprise acrylic emulsions having, as polymerized units up to 10 wt. % polymerized acid comonomers, preferably up to 3 wt. %, based on the total weight of copolymerized monomers, hydrophobic emulsion polymer comprising greater than 30% by weight, based on the weight of the emulsion polymer solids, ethylenically-unsaturated acrylic monomer containing a $C_2$ or greater alkyl group, and acrylic or styrene acrylic emulsion polymers.

Suitable acid comononers used to make the emulsion polymers may include, for example, methacrylic acid, acrylic acid, fumaric acid, maleic acid, itaconic acid, 2-methyl itaconic acid, a,b-methylene glutaric acid, monoalkyl maleates, and monoalkyl fumarates; ethylenically unsaturated anhydrides such as, for example, maleic anhydride, itaconic anhydride, acrylic anhydride, and methacrylic anhydride; and salts thereof. (Meth)acrylic acid is the preferred carboxy acid comonomer.

The emulsion polymers may be present in the composition in an amount of 1% or more, or, 5% or more, or, up to 50%, or 30% by weight, based on the total binder solids.

The aqueous binder compositions may advantageously further comprise a reactive water proofing agent. Alkoxylated forms of reactive water proofing agent may include, for example, a $C_5$ to $C_{30}$ alk(en)yl monocarboxylate of a (poly) alkoxylated trihydric polyol, $C_5$ to $C_{30}$ alk(en)ylamine(poly) alkoxylate, $C_5$ to $C_{30}$ alk(en)yl diamine(poly)alkoxylate, $C_5$ to $C_{30}$ alk(en)ylamine(poly)alkoxylate containing an ether or thiother group in the alk(en)ylamine group, and mixtures thereof. Reactive water proofing agents may be used in amounts of up to 10 wt. %, based on the total binder solids.

The aqueous binder compositions may further comprise additives, such as lignins and lignosulfonates, biocides; flame retardants, corrosion inhibitors such as, for example, triazole and phosphate compounds, tin oxalates, thioureas, oxalates, and chromates, dedusting agents such as, for example, mineral oils, anti-foaming agents such as dimethicones and poly (dimethicones), silicon-polymer (polysiloxane) oils and ethoxylated nonionics. The biocides may, in one embodiment be applied as separate solution along with the aqueous binder compositions in use as part of binder application. Alternatively or in conjunction with applying biocide to the binder, biocide can be applied to the "white water" at the production site. This water can be used in processing the manufactured product and or making the applied binder solution.

Suitable lignins and lignosulfonates for use in the aqueous binder compositions are water soluble or water dispersible lignin or lignosulfonate with >2 wt % organic acid and/or phenolic functional groups present in their composition.

In another aspect of the present invention, the aqueous binder compositions may further comprise extenders such as soy flour, defatted soy flour, soy protein isolate and denatured forms of these. Denaturation improves processing and can be enhanced by including an alkali(ne)bisulfite, a defoamer or both.

In yet another aspect of the present invention, the aqueous binder compositions can further comprise coupling agents such as silanes, particularly Silquest™ A-187 (manufactured by GE Silicones-OSi Specialties, located in Wilton Conn.); other amino silanes such as 3-aminopropyl dialkoxysilanes and 3-(2-aminoethyl)aminopropylsilanes; epoxy silanes, such as glycidoxypropylsilanes, vinyl silanes and hydrophobic silanes, such as, a hydrolysable group (i.e. alkoxy or epoxy) containing octylsilane.

To minimize the formaldehyde content of the aqueous composition, it is preferred, when preparing a polymer-containing formaldehyde-free curable composition, to use polymerization adjuncts and additives such as, for example, initiators, reducing agents, chain transfer agents, curing agents, biocides, surfactants, emulsifiers, coupling agents, anti-foaming agents, dust suppressing agents, fillers and the like, which are themselves formaldehyde free, or do not contain or generate formaldehyde during binder formation, application or cure.

The present invention provides methods of using the binder comprising applying the binder to a substrate and drying and/or curing. In drying (if applied in aqueous form) and curing the curable compositions, the duration, and temperature of heating, will affect the rate of drying, ease of processing or handling, and property development of the treated substrate. Suitable heat treatment temperatures may range 100° C. or more, and up to 400° C. The preferred treatment is substrate dependant. Thermally sensitive substrates such as cellulose fibers may be treated at a substrate temperature of 100 to 175° C. while thermally less sensitive composites may be treated at substrate temperatures of 1540 to 200° C., and thermally resistant substrates such as mineral fibers may be treated at substrate temperatures of 200 to 300° C. for the desired times necessary to effect cure. Preferably, for wood and woody substrates, heat treatment temperatures (platen temperatures) range 150° C. or higher; such preferred heat treatment temperatures may range up to 200° C., or, up to 175° C. In some methods of use, the composition components need not all be pre-mixed prior to application of the binder to the substrate. For example, one or more components may be applied to a non-woven substrate, followed by application of the other binder components of this invention either in aqueous or dried form. After application, the binder can be cured by heating the coated non-woven to a sufficient temperature where it cures on the substrate.

The binder can be applied to substrates, such as, for example, a web of fibers, by any suitable means including, for example, air or airless spraying, padding, saturating, roll coating, curtain coating, beater deposition, coagulation or dip and squeeze application, and the resultant saturated wet web laying on a supporting wire or screen is run over one or more vacuum boxes to remove enough binder to achieve the desired binder content in the product or treated substrate.

Drying and curing can be done in two or more distinct steps, if desired. For example, the curable composition can be first heated at temperatures and for times sufficient to at least partially dry, but not fully cure the composition, followed by heating for a second time, at higher temperatures and/or for longer periods of time, to effect curing. Such procedures, referred to as "B-staging," can be used to provide binder-treated nonwovens, for example, in roll form, which can be cured later, with or without forming or molding into a particular configuration, concurrent with the curing process.

Suitable substrates for binder application may include, for example, textiles, including cotton, linen, wool, and synthetic textiles from polyester, rayon, or nylon, and superabsorbent fibers; vegetable or cellulosic fibers, such as jute, sisal, flax, cotton and animal fibers; as well as heat resistant substrates, such as metal; plastics; synthetic fibers, e.g. polyester, rayon, poly(acrylonitrile) (PAN), poly(lactic acid) (PLA), poly(caprolactone) (PCL), aramid fibers, polyimide fibers, polyolefins and bi-component fiber comprising two or more fiber-forming polymers such as polypropylene and polyethylene terephthalate; mineral fibers, such as glass and mineral fibers, slag or stonewool, ceramic fibers, metal fibers, carbon fibers, and woven and non-woven fabrics made therefrom; and heat-sensitive substrates, such as wood, including, solid wood, wood particles, fibers, chips, flour, pulp, and flakes; paper and cardboard.

The binders of this invention may preferably be used to treat non-woven webs. "Non-woven web(s)" refers to any article or sheet-like form made from natural and/or synthetic fibers wherein the fibers are aligned in a random or semi-random order (i.e., not deliberately ordered) whether by mechanical means such as, for example, by entanglement caused by needle-punching, spunbonding, spunlace webs, meltblown webs, air-laid (dry laid) process, and by a wet-laid process; and/or by chemical means such as, for example, treatment with a polymeric binder; or by a combination thereof. Mineral fibers may be in the form of a web, i.e. blown into a forming chamber, sprayed with a binder, and deposited as a web on to a conveyer. Some ordering of fibers occurs during any web forming process (primarily in the machine direction). Included in the definition of non-woven webs suitable for use with this invention are porous films prepared by the action of chemical or mechanical processing (e.g., apertured films).

The wet or uncured binder add on level to a substrate can range from 2 wt. % or more, or 6 wt. % or more, or up to 40 wt. percent of the finished substrate, preferably, 10 wt. % or more, or, most preferably 4 to 25 wt. %, based on the total weight of the treated dry substrate, prior to cure. Powder binders could be used in an amount of 2 to 15 wt. %, based on the total weight of the treated dry substrate, prior to cure.

The present invention further provides wood or woody material containing articles formed from admixtures of finely divided wood or woody materials and the aqueous binder compositions of the present invention in a weight ratio of from 100:1 to 1:1, preferably, 25:1 or less, or, preferably 3:1 or more.

The methods for forming wood, woody or lignocellulosic material containing articles according to the present invention comprise mixing the aqueous binder composition and the finely divided wood, woody or lignocellulosic materials followed by pressing at an elevated temperature. For particle-, chip-, and fibre-board products, the pressing (platen) temperature may range from 20 to 250° C., most preferably from 70 to 200° C. For laminated products, such as laminated flooring or veneered flooring products, the preferred pressing (platen) temperature may range from 70 to about 175° C.

The pressing time and pressing temperature are linked so that lower pressing temperatures generally require longer pressing times. The wood based product to be produced also determines suitable pressing temperatures and pressing times. Suitable pressing times may range from 10 s to 60 minutes, or, preferably 30 s or more, or up to 30 minutes, or, most preferably, 1 minute or more, or, up to 5 minutes.

In drying the finely divided wood or woody material prior to mixing with the aqueous binder composition, the moisture content of suitable material may range from 0 to 20 wt. %, preferably, up to 10 wt. %, or, more preferably, from 1 to 8 wt. %, based on the total weight of the wood or woody material.

Some suitable uses for the binder of the present invention include, for example, making non-structural composites, boards and laminates for indoor furniture, trim and molding, e.g. a flooring material, a veneered furniture material, veneered flooring, laminated flooring, a wall panel, or a composite product such as a particle board, fibre board, chip board, or oriented strand board.

Other suitable uses and substrates for the aqueous binder composition may include, for example, wet end formation and dry end treating or coating of paper, paperboard and cardboard, such as filter media; and the making and treating of woven and non-woven fabrics, such as, for example, fiberglass and stonewool insulation batting, polyester and spun-bonded roof shingles, underlayment and scrim, and gypsum board facings, and filter media, such as air and oil filters.

EXAMPLES

The following examples serve to better illustrate the invention, which is not intended to be limited by the examples.

Examples 1-12

Cure Rate of 5-Carbon Sugars in Aqueous Binder Compositions

Dynamic mechanical analysis (DMA) was used to measure cure rate. A small angle oscillatory strain was applied to a reacting sample and the resultant stress was decomposed into an "in phase" (G', solid-like response) and "out of phase" component (G", liquid-like response). The phase angle by which the stress response lags the strain is known as delta, d, and tan (d) is the ratio of G":G' For small applied strains, the system can be measured continuously through the liquid-solid transition. The instrument used was a TA Instruments DMA Q800, Model#2980 equipped with dual cantilever clamp (TA Instruments Inc., New Castle, Del.), with mathematical analysis conducted using TA Universal Analysis 2000 Software. The following parameters were used in testing:

Temp Ramp: 4° C./min from 30° C. to 250° C.

Substrate: 12.7 mm×34.0 mm Whatman® GF/B filter paper (2 strips as sandwich).

Sample Loading: 0.500 g of a 30 wt. % solution (approx. 4 drops/strip of a 30 weight % aqueous solution of the reagent mixture).

Characteristic cure temperatures were analyzed by the following method in TA Universal Analysis 2000. On a storage modulus (G') versus temperature plot, points corresponding to the "signal maximum" of G' in the cure onset region and the cure final region were noted. Then the onset cure temperature, $T_{onset}$, was determined as the intercept of the line tangent to the signal maximum point and the line tangent to the inflection point using "Glass/Step Transition". The final cure temperature, $T_{final}$, was determined as the intercept of the horizontal line tangent to the point at peak modules (G') and the line tangent to the inflection point. Cure time was the time from onset to end of cure with a heating rate 4° C./min.

TABLE 1

Cure Rates and Times

| Example | Formulation | Reagents | $T_{onset}$ (° C.) | $T_{final}$ (° C.) | Cure Time |
|---|---|---|---|---|---|
| 1 | Xylose + Lysine | 1.50 g xylose<br>0.82 g lysine | 111 | 117 | 90 sec. |
| 2 (comp) | Dextrose + Lysine | 1.50 g dextrose<br>0.68 g lysine | 112 | 150 | 570 sec. |
| 3 | Xylose + bis-(amcycl) | 1.50 g xylose<br>0.78 g bis-(amcycl) | 107 | 115 | 120 sec. |
| 4 (comp) | Dextrose + bis-(amcycl) | 1.50 g dextrose<br>0.65 g bis-(amcycl) | 116 | 128 | 180 sec. |
| 5 | Xylose + PEI | 1.50 g xylose<br>1.89 g PEI | 111 | 122 | 165 sec |
| 6 (comp) | Dextrose + PEI | 1.50 g dextrose<br>1.59 g PEI | 111 | 132 | 315 sec |
| 7 | Xylose + TRIS | 1.50 g. xylose<br>0.42 g. TRIS | 113 | 122 | 135 |
| 8 (comp) | Dextrose + TRIS | 1.50 g. Dextrose<br>0.35 g. TRIS | 119 | 137 | 270 |

Reagents: 99% D-(+)-Xylose (ACROS, NJ, USA); 97% L-Lysine (SACF Supply St. Louis, MO); 99% D-(+)-Dextrose anhydrous (ACROS, NJ, USA); 98% 1,3-bis(aminomethyl) cyclohexane = bis-(amcycl) (ACROS, NJ, USA); Polyethyleneimine, low Mw (2000) 50% in water = PEI (Sigma-Aldrich, Milwaukee, WI); TRIS = tris(2-aminoethyl)-amine, 96% (Sigma-Aldrich).

As shown in Table 1, above, the binders in Examples 1, 3, 5 and 7 containing xylose, a 5-carbon sugar, cured considerably faster than the binders in Examples 2, 4, 6 and 8 containing dextrose, a 6-carbon sugar; and all of the inventive Examples 1, 3, 5 and 7 cured at a substantially lower temperature than the comparatives, in particular $T_{final}$. The same comparative results were obtained regardless of the amine used.

Examples 9-12

Other 5-Carbon Sugars in Aqueous Binder Compositions

The DMA analysis was repeated as in Examples 1-8, above, except that a 50 wt. % aqueous reagent mixture was used. All reagents were the same as in Examples 1-6, except as otherwise indicated.

TABLE 2

Cure Rates and Times

| Example | Formulation | Reagents | $T_{onset}$ (° C.) | $T_{final}$ (° C.) | Cure Time |
|---|---|---|---|---|---|
| 9 (comp) | Dextrose + bis-(amcycl) | 0.70 g. Dextrose<br>0.30 g. bis-(amcycl) | 119 | 133 | 210 |
| 10 | Xylose + bis-(amcycl) | 0.70 g. Xylose<br>0.30 g. bis-(amcycl) | 109 | 120 | 165 |
| 11 | Arabinose + bis-(amcycl) | 0.70 g. Arabinose<br>0.30 g. bis-(amcycl) | 110 | 120 | 150 |
| 12 | Ribose + bis-(amcycl) | 0.70 g. Ribose<br>0.30 g. bis-(amcycl) | 107 | 117 | 150 |

Reagents: 99% D-Ribose, ACROS; 99% D-Arabinose, Fisher Bioreagents (Fair Lawn, NJ).

As shown in Table 2, above, the binders containing 5-carbon sugars xylose, arabinose and ribose, respectively, in Examples 10, 11 and 12 all cured considerably faster than binders containing dextrose, a 6-carbon sugar, in Example 9. All 5-carbon binders cured at a substantially lower temperature, in particular $T_{final}$.

Examples 13-15

Particleboard Swell

Making Binder for Application to Wood:

Example 13

Dextrose/bis-(amcycl)

140 grams of a 50% dextrose in water solution was mixed with 60 grams of a 50% aqueous solution of 1,3-bis(aminomethyl)cyclohexane. 132 grams of this resin mixture was then added to 14 grams of deionized water. The resulting solution was then sprayed with a Wagner Control Spray™ HVLP power sprayer (Wagner Spray Tech, Minneapolis, Minn.) with an "extra reach" extension into a tumbling miniature cement mixer that contained 835 grams of oven dried, fine particle sized wood (dried at 105° C. for approximately 2 hours to approximately 1-2% moisture content or 98-99% wood solids).

Example 14

½ Xylose/½ Dextrose) with bis-(amcycl 70 grams of a 50% xylose in water solution and 70 grams of a 50% dextrose in water solution were mixed with 60 grams of a 50% aqueous solution of 1,3-bis(aminomethyl)cyclohexane. 132 grams of this resin mixture was then added to 14 grams of deionized water. The resulting solution was then sprayed with a Wagner Control Spray™ HVLP power sprayer with an "extra reach" extension into a tumbling miniature cement mixer that contained 835 grams of oven dried, fine particle sized wood (dried at 105° C. for approximately 2 hours to approximately 1-2% moisture content or 98-99% wood solids).

Example 15

Xylose/bis-(amcycl)

140 grams of a 50% xylose in water solution was mixed with 60 grams of a 50% aqueous solution of 1,3-bis(aminomethyl)cyclohexane. 132 grams of this resin mixture was then added to 14 grams of deionized water. The resulting solution was then sprayed with a Wagner Control Spray™ HVLP power sprayer with an "extra reach" extension into a tumbling miniature cement mixer that contained 835 grams of oven dried, fine particle sized wood (dried at 105° C. for approximately 2 hours to approximately 1-2% moisture content or 98-99% wood solids).

Particleboard Formation: Three layer pre-pressed particleboard samples were formed using an 279.4 mm×279.4 mm×76.2 mm deep deckle box placed on an aluminum sheet containing 12.7 mm stops on 2 sides and covered with a thin Mylar plastic sheet.

Example 13A

Dextrose/bis-(amcycl)

Approximately 817 grams of wood from the above example was spread evenly in the box. This "pre-board" was then compressed with a flat plunger and the deckle box was removed. An additional Mylar plastic sheet and aluminum sheet was placed on top of the board. The board was then placed into a Carver (Model 4533, 381 mm×381 mm platens, Wabash, Ind.) hot press and pressed for 300 seconds at 165° C. at 50,000 pounds of pressure. The board was then removed from the press and allowed to cool to room temperature. The board was then cut into 16 50.8 mm×50.8 mm pieces with a band saw and stored overnight in a constant temperature (77° F., 25° C.) and humidity room (50%).

Example 14A

½ Xylose/½ Dextrose with bis-(amcycl)

The particleboard formation in Example 13A, above. was repeated above with the 50/50 blend of dextrose/xylose binder from Example 14, above.

Example 15A

Xylose/bis-(amcycl)

The particleboard formation in Example 13A, above. was repeated above with the xylose binder from Example 15, above.

Swell measurements were conducted as per ASTM D1037-06a section 23 (2006) on samples conditioned overnight. Eight specimens from each board were tested (taken from various areas of the board) with the average and standard deviation being reported from the 8 specimens. Results are reported in percent thickness swell (final thickness–initial thickness) divided by initial thickness.

TABLE 3

Particleboard Swell Results

| Example | Formulation | Average Swell | Standard Deviation |
|---|---|---|---|
| 13 (comp) | Dextrose/bis-(amcycl) | 148% | 5% |
| 14 | Dextrose/Xylose/ bis-(amcycl) | 71% | 5% |
| 15 | Xylose/bis-(amcycl) | 53% | 3% |

As shown in Table 3, above, the particleboard swell in boards made with 5-carbon reducing sugar binders and blends of 5-carbon and 6-carbon sugars, respectively, in Examples 14 and 15 was substantially lower than the swell in boards made with dextrose, a 6-carbon sugar, in Example 13.

We claim:

1. An aqueous binder composition substantially free of polycarboxylic acids comprising (i) one or more diprimary diamine or poly(primary amine), and (ii) one or more 5-carbon reducing sugar chosen from xylose, ribose, arabinose, lyxose, or xylulose; an optical isomer thereof; a hydroxy, halo, alkyl, alkoxy or carbonyl substituted reducing monosaccharide; and a dehydrated reducing monosaccharide;

wherein the number of equivalents of primary amine relative to the number of equivalents of carbonyl groups in the 5-carbon reducing sugar, or the equivalent ratio, ranges from 0.2:1 to 1.6:1 with the equivalent ratio defined such that a composition having a 2:1 equivalent ratio of primary amine groups in a diprimary diamine to carbonyl groups in the 5-carbon reducing sugar equates to a composition having equal moles of a diprimary diamine and a reducing sugar having one carbonyl group, and, further wherein, when (i) is a poly(primary amine), it is a polyamine having a weight average molecular weight of 5,000 or less and 10 wt. % or more of primary amine groups, based on the total weight of the polyamine.

2. The binder composition as claimed in claim 1, wherein the (i) diprimary amine or poly(primary amine) has an amine equivalent weight of 400 or less.

3. The binder composition as claimed in claim 1, wherein the number of equivalents of primary amine relative to the number of equivalents of carbonyl groups in the 5-carbon reducing sugar, or the equivalent ratio, ranges from 0.4:1 to 1.6:1 with the equivalent ratio defined such that a composition having a 2:1 equivalent ratio of primary amine groups to carbonyl groups in the 5-carbon reducing sugar equates to equal moles of a diprimary diamine and a reducing sugar having one carbonyl group.

4. The binder composition as claimed in claim 1, further comprising one or more reducing sugar other than a 5-carbon reducing sugar.

5. The binder composition as claimed in claim 1, further comprising a reducing agent.

6. The binder composition as claimed in claim 1, further comprising a lignin or a lignosulfonate.

7. The binder composition as claimed in claim 1, further comprising an extender.

8. The binder composition as claimed in claim 1, further comprising a phosphorous-containing accelerator or esterification catalyst.

9. The binder composition as claimed in claim 1, wherein the (i) diprimary diamine is chosen from aliphatic primary diamines, cycloaliphatic primary diamines, aromatic diprimary amines, and diamine oligomers.

10. A method comprising:
  admixing the aqueous binder composition as claimed in claim 1 with finely divided wood or woody materials
  pressing and heating the thus formed admixture to form a product.

* * * * *